(12) United States Patent
Borzenski et al.

(10) Patent No.: US 7,404,664 B2
(45) Date of Patent: Jul. 29, 2008

(54) KEEL TYPE RAM FOR USE IN INTERNAL BATCH MIXERS WITH TANGENTIAL ROTORS

(75) Inventors: Frank Borzenski, Old Saybrook, CT (US); Stephen E. Peterson, Trumbull, CT (US); John Neugebauer, Cheshire, CT (US)

(73) Assignee: Farrel Corporation, Ansonia, CT (US)

( * ) Notice: Subject to any disclaimer, the term of this patent is extended or adjusted under 35 U.S.C. 154(b) by 213 days.

(21) Appl. No.: 11/343,820

(22) Filed: Jan. 31, 2006

(65) Prior Publication Data

US 2007/0177450 A1 Aug. 2, 2007

(51) Int. Cl.
*B29B 7/24* (2006.01)
(52) U.S. Cl. .................................................. 366/76.7
(58) Field of Classification Search ................ 366/76.1, 366/76.7, 76.8, 76.9, 76.93, 254.1, 154.1; 425/583
See application file for complete search history.

(56) References Cited

U.S. PATENT DOCUMENTS

| | | | | | |
|---|---|---|---|---|---|
| 1,200,070 | A | * | 10/1916 | Banbury | 366/91 |
| 1,396,138 | A | * | 11/1921 | Mosher | 366/76.7 |
| 1,905,755 | A | * | 4/1933 | Banbury et al. | 366/76.7 |
| 2,918,699 | A | | 12/1959 | Hall | |
| 3,191,231 | A | | 6/1965 | Wentorf, Jr. | |
| 3,525,387 | A | * | 8/1970 | Matsuoka | 165/47 |
| 3,572,645 | A | * | 3/1971 | Matsuoka | 366/76.7 |
| 3,610,585 | A | * | 10/1971 | MacLeod et al. | 366/149 |
| 4,620,793 | A | * | 11/1986 | Bell | 366/76.7 |
| 4,744,668 | A | * | 5/1988 | Nortey | 366/76.7 |
| 4,834,543 | A | * | 5/1989 | Nortey | 366/97 |
| 5,061,078 | A | * | 10/1991 | Yada | 366/76.2 |
| 5,516,206 | A | * | 5/1996 | Seide et al. | 366/76.7 |
| 6,422,733 | B1 | * | 7/2002 | Adams et al. | 366/76.7 |
| 6,494,607 | B2 | * | 12/2002 | Valsamis et al. | 366/84 |
| 7,329,036 | B2 | * | 2/2008 | Matsumoto | 366/76.7 |
| 2007/0127307 | A1 | * | 6/2007 | Matsumoto | 366/76.7 |
| 2007/0177450 | A1 | * | 8/2007 | Borzenski et al. | 366/76.7 |

FOREIGN PATENT DOCUMENTS

| | | | |
|---|---|---|---|
| DE | 3426442 C1 | * | 12/1985 |
| EP | 845339 A1 | * | 6/1998 |
| EP | 995564 A1 | * | 4/2000 |
| GB | 2231503 A | * | 11/1990 |
| JP | 1-167433 | * | 7/1986 |
| JP | 4-62005 | * | 2/1992 |
| JP | 7-124941 | * | 5/1995 |
| JP | 10119035 A | * | 5/1998 |
| JP | 10-244143 | * | 9/1998 |
| WO | WO 9934964 A1 | * | 7/1999 |

* cited by examiner

*Primary Examiner*—Charles E Cooley
(74) *Attorney, Agent, or Firm*—Ohlandt, Greeley, Ruggiero & Perle, LLP; George W. Rauchfuss, Jr.

(57) ABSTRACT

This invention provides a ram for use in a mixer with counter-rotating non-intermeshing rotors on which the central portion of the ram utilizes a apex, either a point or a line produced by a "V" or similar shape, that protrudes a given distance into the mixing chamber and on which the end portions of the ram are either horizontal such that they do not protrude into the mixing chamber at all or are otherwise shaped such that they protrude into the mixing chamber less than the apex of the central portion of the ram.

8 Claims, 7 Drawing Sheets

KEEL TYPE RAM FOR USE IN INTERNAL BATCH MIXERS WITH TANGENTIAL ROTORS

FIELD OF THE INVENTION

This invention relates to an improved ram for use especially in internal batch mixers with counter-rotating, non-intermeshing, tangential rotors. The improved rams of this invention provide equal or better distributive and dispersive mixing while reducing vibration of the ram and decreasing mixer noise, and permit increased batch sizes. The invention also relates to internal batch mixing machines employing the improved rams and to processes for mixing polymeric and/or rubber materials and optionally additives using an internal batch mixing machine employing the improved rams of this invention.

BACKGROUND TO THE INVENTION

This invention relates to the field of high intensity internal mixing machines of the batch type having a mixing chamber shaped to accommodate two counter-rotating, non-intermeshing, tangential winged rotors. The batch of ingredients to be mixed into a homogeneous mass is fed down into the mixing chamber through a vertical chute and is pushed down under pressure by a ram located in the chute. This ram is hydraulically, pneumatically or electrically driven. The lower face of the ram, when advanced down to its operating position during mixing of the batch, forms an upper portion of the mixing chamber. The homogeneous mixture produced is removed from the mixing chamber through a discharge opening at the bottom of the chamber, and a door associated with this opening is then closed in readiness for the next batch of ingredients to be introduced down through the chute. The homogenous mixture can also be removed in an alternative design by raising the hopper, tilting the mixing chamber and reversing the rotor direction. This batch mixer design is commonly referred to as a "tilt mixer." The homogenous mixture can also be removed by a mechanism where in the hinged side of the mixer is opened allowing the mixture to be removed from the mixing chamber. This design is commonly referred to as a "swing or hinged side discharge" batch mixer.

Some internal batch mixing machines are designed with non-intermeshing rotors, and others have intermeshing rotors. Intermeshing rotors must always be driven at the same rotational speed in synchronized relationship; non-intermeshing rotors may be driven at the same rotational speed or at different rotational speeds for achieving different mixing and kneading effects. The present invention relates to the non-intermeshing type. The wings of the rotors have a generally helical configuration, and they produce high intensity mixing and homogenization by the co-operative interaction of their various forceful dynamic effects, as described later. For further information about such internal batch mixers, having non-intermeshing rotors, reference may be made to U.S. Pat. Nos. 1,200,070 and 3,610,585, assigned to predecessors of the present assignee, and to U.S. Pat. Nos. 4,744,668 and 4,834,543, assigned to the present assignee, and the disclosures of these patents are incorporated herein by reference as background information.

The wings of rotors employed in internal batch mixers have a generally helical configuration and they therefore produce high intensity mixing and homogenization by the co-operative interaction of the various forceful dynamic effects. Traditionally, the rotors in non-intermeshing type internal batch mixers have been driven at different speeds (non-synchronous rotor mixing). In more recent years, manufacturers have designed non-intermeshing type rotors that are intended to operate at equal speed (synchronous rotor mixing), such as for example, the rotors of the type disclosed in assignee U.S. Pat. No. 6,494,607, incorporated herein by reference thereto. Such rotors have produced increased distributive and dispersive mixing of materials in the internal batch mixers. Additionally, in order to decrease mixing cycle times, users of non-intermeshing type mixers have sought to increase the rotor speeds.

While the rams utilized in intermeshing rotor mixers have utilized a non-uniform shape for the portion of the ram that protrudes different distances into the mixer, the rams heretofore utilized in these latter non-intermeshing rotor type internal batch mixers have had a "flat bottom" that does not protrude at all into the mixing chamber or a "V" type shaped bottom that has a uniformly shaped bottom from end-to-end, with the apex of the "V" along the whole bottom surface of the ram and running parallel to the rotational axis of the rotors in the internal batch mixer, such that the ram protrudes into the mixing chamber of the internal batch mixer an equal amount along the entire length of the ram and thus essentially along the entire length of the rotors. It has now been discovered that due to the shape of the helix on the rotors, with each revolution of the rotors during the mixing cycle, material to be mixed in the mixing chamber of the internal batch mixer is forced against each quadrant of the ram at different times producing varying forces on the ram and causing cyclical rotational forces on the ram. While, for traditional non-synchronous driven rotor internal batch mixers operated at relatively low rotor rotation speeds these varying cyclical rotational forces have not posed significant difficulties, the inventors have found this not to be the case for synchronous driven rotor internal batch mixers operating with increased rotor speeds. In this latter case, the inventors have discovered that the combination of synchronous rotor design and increased rotor speed has produced a more aggressive flow of material in the mixing chamber and significantly increased the cyclical rotational forces on the "V" bottom of the ram. As the rotors in the mixing chamber turn, the material being mixed is moved across resulting in substantial, significant noise and vibration of the ram against the sides of mixing chamber and housing associated therewith during operation of the internal batch mixer and resulting in significant wear on the ram and throat of the mixing chamber. With these new rotors and increased rotor speed the material being mixed is moved axially to the rotor end plates causing the ram to move from side to side. Due to the rotor wing interaction (rotor to rotor) the material being mixed is also transferred from one mixing chamber cavity to the other. If the mix is high in viscosity, the ram is moved up and down in the throat opening of the mixer as the material transfer is occurring. If the mix is low in viscosity, the "V" of the ram bottom restricts rotor-to-rotor exchange of the mix and the product mix turns with the rotor in the each cavity. All this movement creates noise, wear and mechanical impact damage. With the "flat bottom" ram design, material is not pushed into the mixing chamber between the rotors and has a tendency to stagnate under the flat section of the bottom of the ram, never entering the mixing chamber. There is, therefore, a need for an improved ram for use in counter-rotating, non-intermeshing rotor internal batch mixers, and particularly an improved ram for such mixers that provides at least equivalent or better distributive and dispersive mixing as obtained with the standard "V" ram, but that significantly reduces or substantially eliminates the cyclical rotational forces on the ram that causes the aforementioned noise, wear and damage caused by motion of the ram.

SUMMARY OF THE INVENTION

This invention provides a ram for use in a mixer with counter-rotating non-intermeshing rotors on which the central portion of the bottom face or surface of the ram utilizes a protruding apex, either a point or a line produced by a "V" or similar shape, that protrudes a given distance into the mixing chamber and on which the end portions of the ram are either horizontal such that they do not protrude into the mixing chamber at all or are otherwise shaped such that they protrude into the mixing chamber less than the apex of the central portion of the ram. A mixer utilizing the improved ram substantially reduces the rotational forces on the ram, producing lower noise levels and reduces wear and impact damage. At the same time, the improved ram provides similar dispersive mixing and improved distributive mixing characteristics to a traditional "V" shape ram that extends into the mixing chamber an equal distance along the entire lateral bottom surface of the ram.

The ram of this invention for use in a counter-rotating, non-intermeshing, internal, intensive batch mixing machine, comprises a ram with an upper and lower portion. The upper portion of the ram is designed to connect to a mechanism of some type (most commonly a piston rod) that allows the ram to be raised to a raised position to permit the introduction of ingredients into an ingredients-receiving opening of the mixing chamber, and lowered to a lowered position to move the ingredients down into the mixing chamber, close the ingredients-receiving opening of the mixing chamber, and oppose the forces exerted by the materials or ingredients in the mixing chamber. The lower portion of the ram has a bottom surface or bottom face for facing the mixing chamber when the ram is lowered to the lowered position, said bottom surface or face having a lateral length L. The bottom surface comprises a first end at a first lateral end of the length of the bottom surface of the ram, and a second end at the opposite lateral end of the length of the bottom surface of the ram. There is a central section between said first and second ends, said central section comprising four protruding surfaces that meet at a protruding apex (point or generally lateral line parallel to a rotational axis of rotors of the internal batch mixing machine with which the ram is to be employed). Each protruding surface of the central section is shaped such that a horizontal cross-sectional area of said central section of the bottom surface is of a smaller cross-sectional area than the cross-sectional area of the ingredients-receiving opening into the mixing chamber of the internal batch mixer into which the ram is to be inserted, such that the protruding apex is of a lateral distance less than the lateral length L of the bottom surface. The central section is sized such that protruding apex will extend a distance into the mixing chamber of the internal batch mixing machine with which the ram is to be used when the ram is lowered to it lowered position.

In one embodiment of the ram of this invention, the bottom surface or bottom face portion of the ram also has a first intermediate section extending from the first end of the bottom surface to one edge of the central section, and a second intermediate section extending from the second end of the bottom surface to another and opposite edge of the central section. Each of said intermediate sections has a lateral length A and comprise a generally flat planar horizontal surface that does not extend into the mixing chamber of the internal batch mixing machine as far a distance as the distance the protruding apex of the central section would extend when the ram is lowered into the lowered position. The protruding apex of the central section being of a lateral length equal to or less than L minus (2×A). In a further variant of this embodiment, each of the intermediate sections may be of a shaped section that would protrude into the mixing chamber, but would extend into the mixing chamber a distance less than the distance the protruding apex of the central section extends into the mixing chamber.

In another embodiment of the ram of this invention, a first of the four protruding surfaces of the central section extends from the first end of the bottom surface of the ram to a first end of the protruding apex line, a second of the four protruding surfaces of the central section extends from the second end of the bottom surface of the ram to a second and opposite end of the protruding apex line, The first and second protruding surfaces of the central section extend from one of each of the ends to the protruding apex at an angle generally perpendicular or greater than perpendicular to the protruding apex of the central lateral section.

In another embodiment of the ram of this invention, the first and second intermediate sections of the ram would also protrude a given distance into the mixing chamber when the ram is in its lowered position in connection with an internal batch mixer with which it is to be employed. The distance the first and second intermediate sections extend into the mixing chamber is less than the distance the protruding apex of the central section protrudes into the mixing chamber. The first and second intermediate sections have a combined a cross-sectional area that can be greater than, equal to, or less than the cross-sectional area of the central section.

In the various embodiment of the invention the four surfaces of the central section and the two intermediate sections (if present) of the bottom face of the lower portion of the ram can be generally flat surfaces, curved (concave or convex) surfaces or a mixture of such surfaces.

In accordance with this invention, the various features of the various embodiments may be combined to provide other embodiments of rams of this invention, and the rams of this invention are not limited to the embodiments mentioned.

In the embodiments of the ram of this invention, the protruding apex of the central section of the bottom face or bottom surface of the lower portion of the ram laterally extends only a portion of the lateral length L of the bottom face or surface, and the protruding apex of the central section extends into the mixing chamber a greater distance than the distance the remainder of the bottom surface extends into the mixing chamber.

The invention also comprises internal, intensive batch mixing machines having counter-rotating, non-intermeshing, tangential rotors and having a ram of this invention. The invention further comprises a process for mixing ingredients in an internal, intensive batch mixing machines having counter-rotating, non-intermeshing, tangential rotors wherein the ram in the mixer is a ram of this invention.

BRIEF DESCRIPTION OF THE DRAWINGS

The invention is illustrated by, but not limited to, the invention as shown in the attached drawings in which:

FIG. 3 is a prior art ram heretofore employed in internal, intensive batch mixing machines, having counter-rotating, non-intermeshing rotors in a mixing chamber.

FIG. 4 is a ram that is one embodiment of the subject of this invention.

FIG. 5 is a ram that is a second embodiment of the subject of this invention.

FIG. 6 is a ram that is a third embodiment of the subject of this invention.

FIG. 7 is a ram that is a fourth embodiment of the subject of this invention.

DETAILED DESCRIPTION OF THE INVENTION

Figure 1:
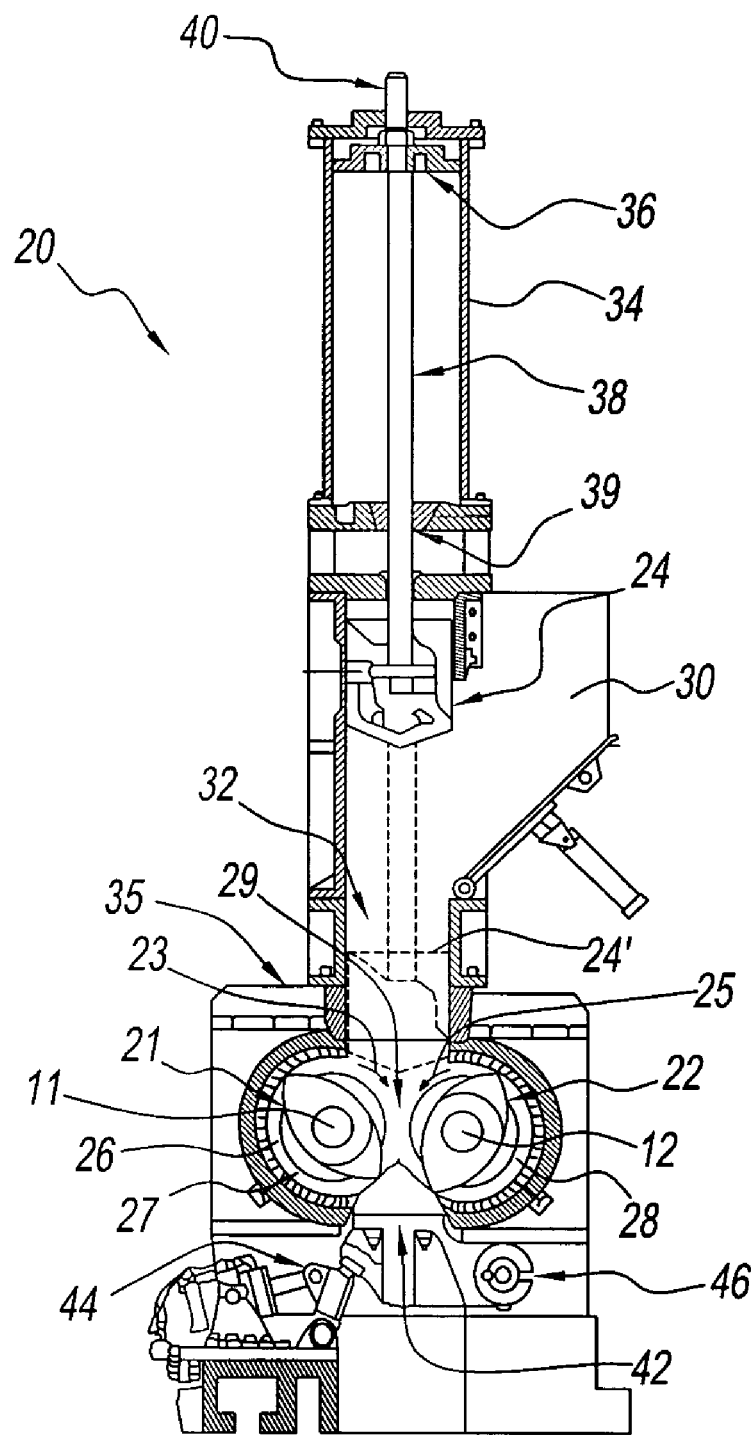
FIG. 1 is an elevational view of an internal batch mixing machine for employing the ram of this invention.

As shown in FIG. 1, a high intensity internal mixing machine of the batch type, generally indicated at 20, in which a vertically reciprocatable ram 24 embodying the present invention is movable between a raised position shown in FIG. 1 and a lowered operating position 24' shown in dashed outline. This ram 24 is used to move ingredients to be mixed down into a mixing chamber 26. In its operating position 24', the ram opposes the forces exerted by materials in the mixing chamber 26 as they are being thoroughly and intensely mixed by wings on the two counter-rotating, non-intermeshing rotors 21 and 22, which are turned, as shown by arrows 23 and 25, about spaced parallel horizontal axis 11 and 12. The left rotor 21 as seen in FIG. 1, is turned in a clockwise direction about its axis 11 and the right rotor 22 in a counterclockwise direction about its axis 12. The mixing chamber 26 is shaped to accommodate these two tangential rotors and includes left and right chamber cavities 27 and 28 each of generally circular cylindrical shape. These chamber cavities are positioned in horizontally opposed relationship open toward each other. There is a central region 29 of the mixing chamber 26 that is defined as being located generally between the two rotors 21 and 22.

The ingredients to be mixed are initially introduced into a hopper 30, while the ram 24 is raised, so that the ingredients can enter a chute 32 communicating with the hopper 30 and leading down into the central region 29 of the mixing chamber 26. Then the ram is lowered to push the ingredients down through an ingredients-receiving opening and into the mixing chamber and to retain them therein. This ram is connected to a rod 38 that shown being operated by a fluid-actuated drive cylinder 34, mounted at the top of the overall housing 35 of the mixing machine 20. The cylinder 34 as shown contains a double-acting piston 36 that drives the rod 38 connected to the ram 24 for lowering and raising the ram. The ram is secured to the lower end of the rod 38 below the bottom end 39 of the cylinder 34. Actuating fluid under the desired pressure is fed through a supply line 40 into the upper portion of the cylinder 34 for urging the piston 36 downwardly to the lowered operating position 24'. After the mixing operation has been completed, the ram is retracted back up to its raised position by actuating fluid fed into the cylinder 34 below the piston 36 through a supply line not seen in FIG. 1. The rod 38 also may be lowered and raised by means of attached hydraulic cylinders or an electrical drive system.

The mixed and homogenized materials (shown) are discharged from the bottom of the mixing chamber 26 through a discharge opening normally closed by a door 42 which is held in its closed position during mixing operation by a locking mechanism 44. The door 42 when released by the locking mechanism 44 is swung down around a hinge shaft 46. The door is swung, for example, by a pair of hydraulic torque motors, not shown, mounted on opposite ends of the hinge shaft 46.

Figure 2:
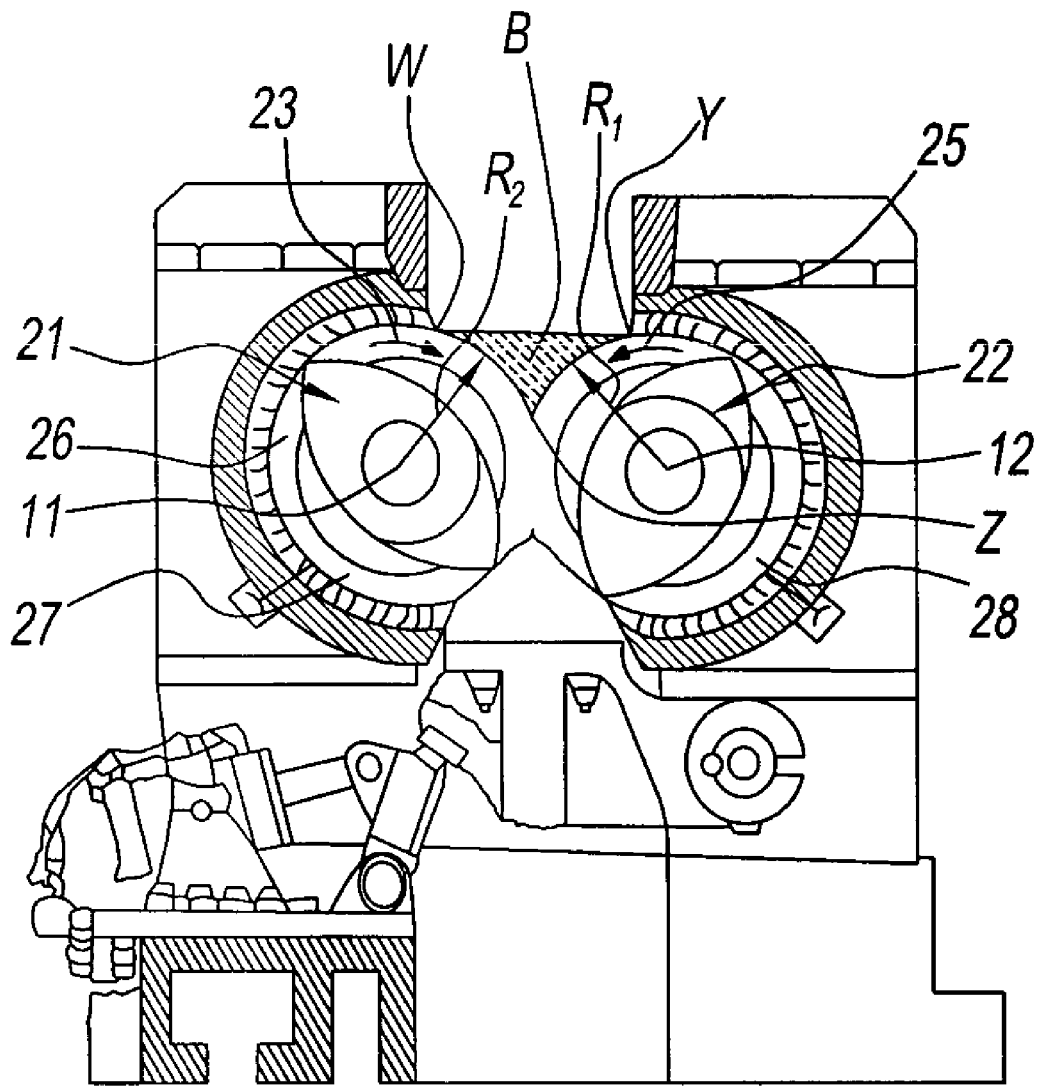
FIG. 2 is an elevational view of the body portion of an internal batch mixing machine for employing the ram of this invention.

FIG. 2 shows the body portion of the high intensity internal batch mixing machine. The body includes two counter-rotating rotors 21 and 22, which are turned, as shown by arrows 23 and 25, about spaced parallel horizontal axis 11 and 12. The mixing chamber 26 is shaped to accommodate these two rotors and includes left and right chamber cavities 27 and 28 each of generally circular cylindrical shape. These chamber cavities are positioned in horizontally opposed relationship open toward each other. The upper portion of the each of the left and right chamber cavities 27 and 28 are open, leaving an area B extending the length of the chamber parallel to the rotors that is defined by a line running from point w to point y, a line running from point y to point z at a radius $R_1$ and a line running from point z to point w at a radius $R_2$.

Figure 3A:
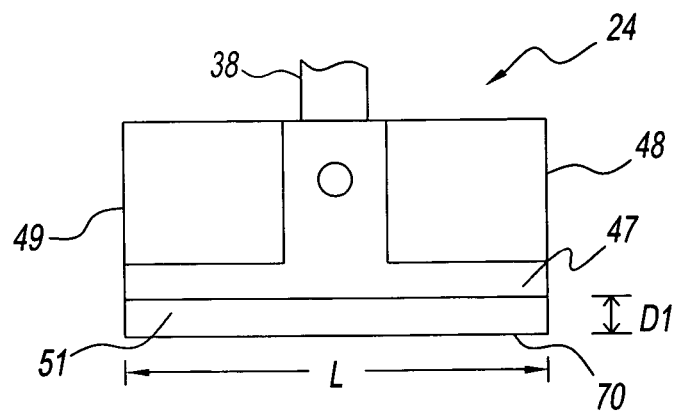
FIG. 3A is a side elevational view of the prior art ram.
Figure 3B:
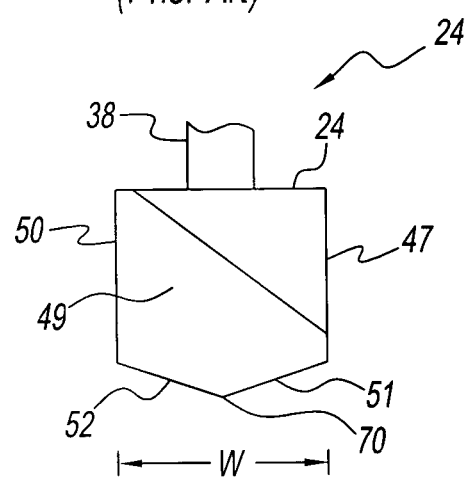
FIG. 3B is an end elevational view of the ram of the prior art ram of FIG. 3A.
Figure 3C:
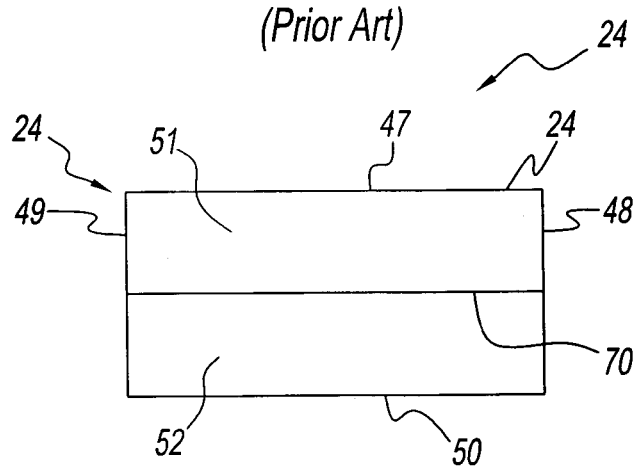
FIG. 3C is a bottom elevational view of the prior art ram of FIG. 3A.

FIGS. 3A, 3B and 3C show the traditional prior art type "V" bottom ram 24 attached to the rod 38. The ram is a length L and width W with a "V" protruding apex 70 that extends the entire length L and protrudes a distance D1. The ram includes four vertical surfaces 47, 48, 49 and 50 to guide the ram in the hopper 30 and two downward facing surfaces 51 and 52 that conforms generally to the top of the mixing chamber 29 and applies pressure to the ingredients when the ram is lowered. In the traditional prior art ram, surfaces 51 and 52 of the bottom surface are uniform and extend the entire length L of the ram and meet at a protruding apex 70 running parallel to the rotational axis 11 and 12 of the rotors 21 and 22 of the mixer with which the ram is employed.

Figure 4A:
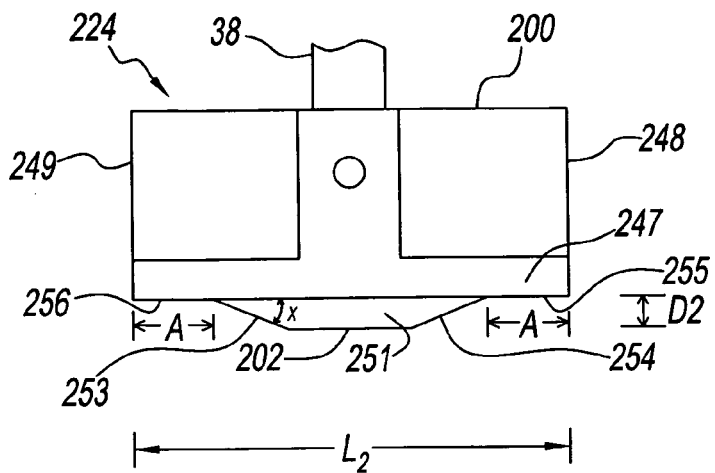
FIG. 4A is a side elevational view of the ram.
Figure 4B:
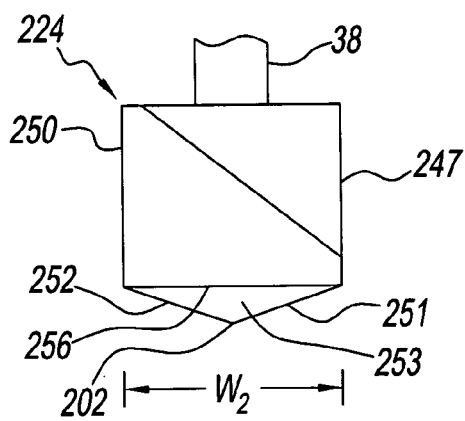
FIG. 4B is an end elevational view of the ram of FIG. 4A.
Figure 4C:
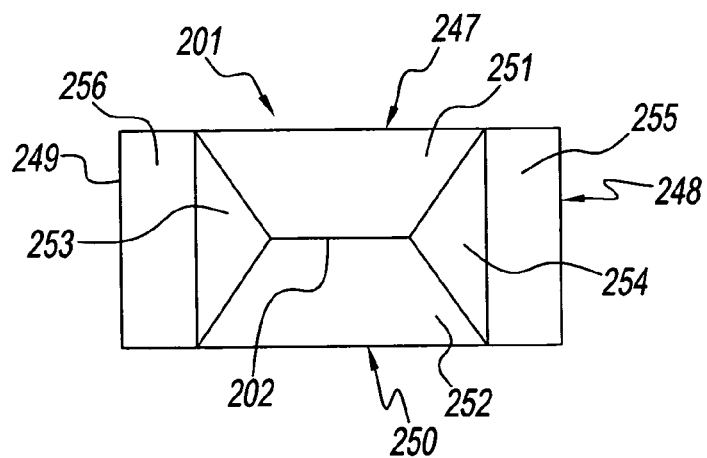
FIG. 4C is a bottom elevational view of the ram of FIG. 4A.

FIGS. 4A, 4B and 4C show one embodiment of a ram 224 of this invention. The top or upper portion 200 of the ram 224 is attached to the rod 38. The lower portion of the ram has a bottom surface 201. The ram 224 is of a lateral length $L_2$ and width $W_2$ with a "V"-type protruding apex 202 that extends less than the entire length $L_2$ and protrudes a distance D2. The ram 224 includes four vertical surfaces 247, 248, 249 and 250 to guide the ram into the hopper 30 (not shown in FIG. 4) of the mixer. In a central section of the bottom surface 201 there are four downward facing surfaces 251, 252, 253 and 254 that form the protruding apex 202. Between the four surfaces 251, 252, 253 and 254 forming the central section and the opposing edges 248 and 249 of the bottom surface 201 are intermediate sections 255 and 256 comprising flat planar horizontal surfaces. When the ram 224 is lowered into the mixing chamber surfaces 251 to 256 close the ingredients-receiving opening of the mixer and form the top of the mixing chamber and apply pressure to the ingredients. In this embodiment of the invention, surfaces 255 and 256 extend a distance A along the lateral length $L_2$ of the bottom surface 201 of the ram and are horizontal their entire width A such that they do not extend into the mixing chamber when the ram is lowered. The faces of surfaces 253 and 254 each extend from surfaces 255 and 256, respectively, at an angle x to the protruding apex 202 of the "V" portion of the ram such that they protrude into the mixing chamber facing more than perpendicular to the rotational axis 11 and 12 of the rotors 21 and 22. Surfaces 251 and 252 extend downward into the mixing chamber with a protruding apex 202 that is parallel to the rotational axis 11 and 12 of the rotors 21 and 22.

Figure 5A:
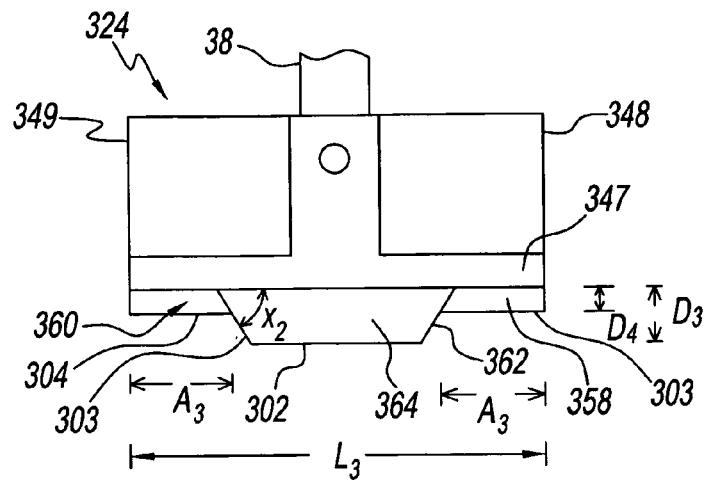
FIG. 5A is a side elevational view of the ram.
Figure 5B:
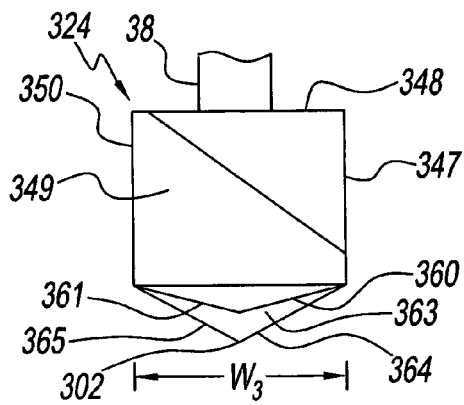
FIG. 5B is an end elevational view of the ram of FIG. 5A.

FIGS. 5A, 5B and 50 show a second embodiment of the ram 324 of this invention attached to the rod 38. The ram is a length $L_3$ and width $W_3$ with a protruding apex 302 that extends less than the entire length $L_3$ and protrudes a distance $D_3$. The ram 324 includes four vertical surfaces 347, 348, 349 and 350 to guide the ram in the hopper 30. The lower portion of the ram 324 has eight downward facing surfaces 358, 359, 360, 361, 362, 363, 364 and 365 that form the top of the mixing chamber 29 and apply pressure to the ingredients when the ram is lowered. In this embodiment of the invention, downwardly facing surfaces 362, 363, 364 and 365 form the central section of the lower portion of ram 324 surfaces and form the protruding apex 302. Between the central section defined by these four surfaces 362, 363, 364 and 365 and the opposing lateral edges 348 and 349 of the bottom surface 301 are surfaces 358, 359, 360 and 361. These surfaces 358, 359, 360 and 361, extend downwardly a distance at least $A_3$ along the length $L_3$ of the ram 324 from the lateral edges 348 and 349 to the surfaces 362, 363, 364 and 365 forming the central section and protrude a distance $D_4$ into the chamber when the ram is lowered. The surfaces 358 and 359 and 360 and 361, respectively form apexes 303 and 304 generally parallel to the rotational axis 11 and 12 of the rotors 21 and 22. Surfaces 364 and 365 of the central section protrude a distance $D_3$ into the chamber when the ram is lowered and provide a protruding apex 302 parallel to the rotational axis 11 and 12 of the rotors 21 and 22. The distance $D_4$ is always less than the distance $D_3$. Surfaces 362 and 363 face the rotational axis 11 and 12 of the rotors 21 and 22 at an angle $x_2$. The angle $x_2$ may be such that surfaces 362 and 363 are perpendicular to or at an angle greater than perpendicular to the rotational axis 11 and 12 of the rotors 21 and 22 of the mixer. In this embodiment of the invention, each of the surfaces 358, 359, 360, 361, 362, 363, 364 and 365 can be either flat or curved so long as the cross-sectional area formed by surfaces 364 and 365 fits within the area B in FIG. 2 and so long as the cross-sectional area formed by surfaces 358 and 359 and surfaces 360 and 361 is smaller than the cross-sectional area formed by surfaces 364 and 365.

Figure 6A:
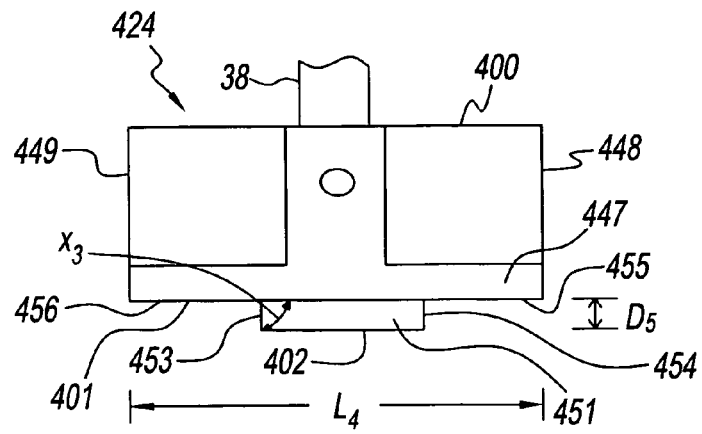
FIG. 6A is a side elevational view of the ram.
Figure 6B:
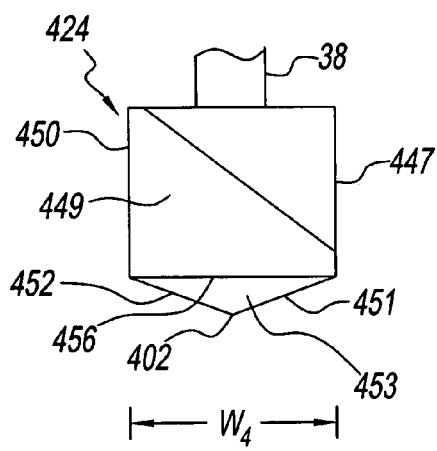
FIG. 6B is an end elevational view of the ram of FIG. 6A.
Figure 6C:
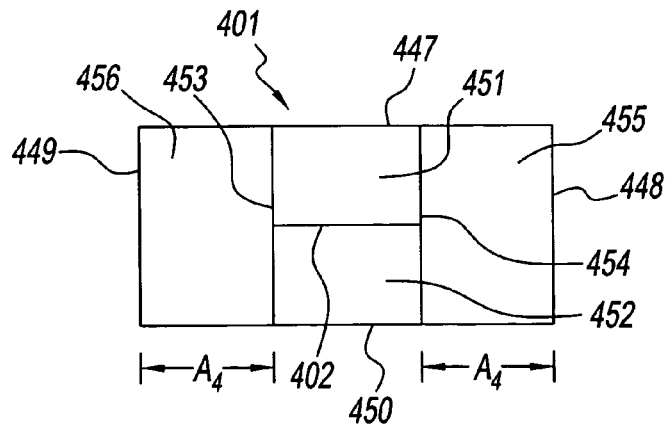
FIG. 6C is a bottom elevational view of the ram of FIG. 6A

FIGS. 6A, 6B and 6C show another embodiment of a ram 424 of this invention similar to the ram shown in FIGS. 4A, 4B and 4C. The ram 424 of this embodiment differs from that of ram 224 in FIGS. 4A, 4B and 4C in that the faces of surfaces 453 and 454 extend from surfaces 455 and 456, respectively, at an angle $X_3$ to the protruding apex 402 of the "V" portion of the ram such that they protrude into the mixing chamber perpendicularly to the rotational axis 11 and 12 of the rotors 21 and 22, i.e., the angle $x_3$ is 90°. The top or upper portion 400 of ram 424 is attached to the rod 38. The lower portion of the ram has a bottom surface 401. The ram 424 is of a lateral length $L_4$ and width $W_4$ with a "V"-type protruding apex 402 that extends less than the entire length $L_4$ and protrudes a distance $D_5$. The ram 424, in a central section, includes four vertical surfaces 447, 448, 449 and 450 to guide the ram into the hopper 30 (not shown in FIG. 6) of the mixer. In a central section of the bottom surface 401 there are four downward facing surfaces 451, 452, 453 and 454 that form the protruding apex 402. Between the four surfaces 451, 452, 453 and 454 forming the central section and the opposing edges 448 and 449 of the bottom surface are intermediate sections 455 and 456 comprising flat planar horizontal surfaces. When the ram 424 is lowered into the mixing chamber surfaces 451 to 456 close the ingredients-receiving opening of the mixer and form the top of the mixing chamber and apply pressure to the ingredients. In this embodiment of the invention, surfaces 455 and 456 each extend a distance $A_4$ along the lateral length $L_4$ of the bottom surface 401 of the ram and are horizontal their entire width $A_4$ such that they do not extend into the mixing chamber when the ram is lowered. The faces of surfaces 453 and 454 each extend from surfaces 455 and 456, respectively, at an angle $x_3$ to the protruding apex 402 of the "V" portion of the ram such that they protrude into the mixing chamber facing perpendicularly to the rotational axis 11 and 12 of the rotors 21 and 22. Surfaces 451 and 452 extend downward into the mixing chamber with a protruding apex 402 that is parallel to the rotational axis 11 and 12 of the rotors 21 and 22.

Figure 7A:
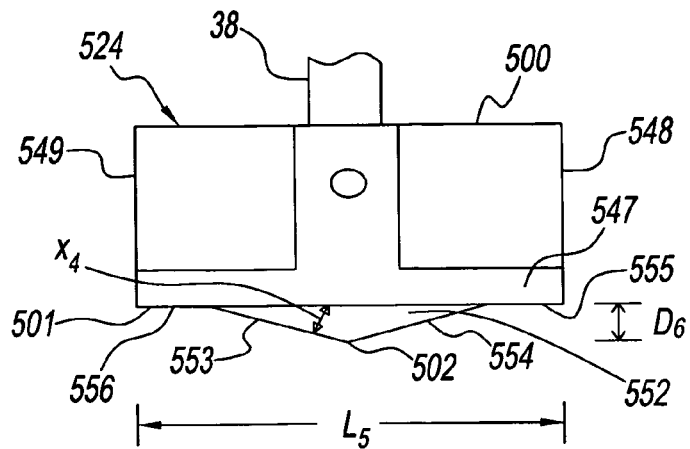
FIG. 7A is a side elevational view of the ram.
Figure 7B:
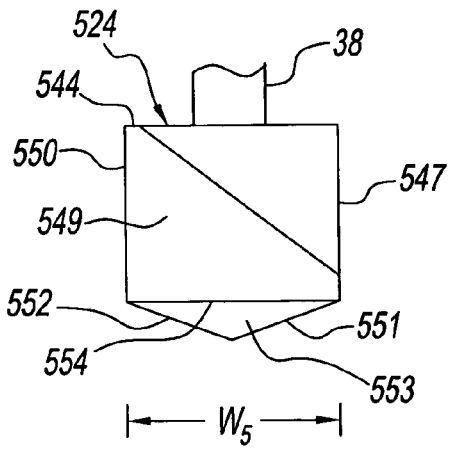
FIG. 7B is an end elevational view of the ram of FIG. 7A.
Figure 7C:
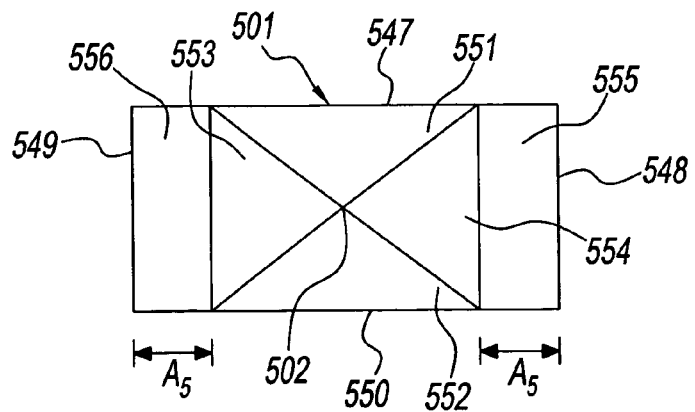
FIG. 7C is a bottom elevational view of the ram of FIG. 7A

FIGS. 7A, 7B and 7C disclose another embodiment of the ram of this invention. In this embodiment, the ram 524 is one wherein the four downwardly extending surfaces 551, 552, 553 and 554 of the central section of the lower portion of the ram meet at a protruding apex 502 that is a point rather than a line. The top or upper portion 500 of ram 524 is attached to the rod 38. The lower portion of the ram has a bottom surface 501. The ram 524 is of a lateral length $L_5$ and width $W_5$ with a protruding apex 502 that is a point and thus extends less than the entire length $L_5$ and protrudes a distance $D_6$. The ram 524 includes four vertical surfaces 547, 548, 549 and 550 to guide the ram into the hopper 30 (not shown in FIG. 6) of the mixer. In a central section of the bottom surface 501 there are four downward facing surfaces 551, 552, 553 and 554 that form the protruding apex 502. Between the four surfaces 551, 552, 553 and 554 forming the central section and the opposing edges 548 and 549 of the bottom surface are intermediate sections 555 and 556 comprising flat planar horizontal surfaces. When the ram 524 is lowered into the mixing chamber surfaces 551 to 556 close the ingredients-receiving opening of the mixer and form the top of the mixing chamber and apply pressure to the ingredients. In this embodiment of the invention, surfaces 555 and 556 each extend a distance $A_5$ along the lateral length $L_5$ of the bottom surface 501 of the ram and are horizontal their entire width $A_5$ such that they do not extend into the mixing chamber when the ram is lowered. The faces of surfaces 553 and 554 each extend from surfaces 555 and 556, respectively, at an angle $x_4$ to the protruding apex 502 of the ram 524 such that they protrude into the mixing chamber at an angle greater than perpendicular to the rotational axis 11 and 12 of the rotors 21 and 22.

Figure 5C:
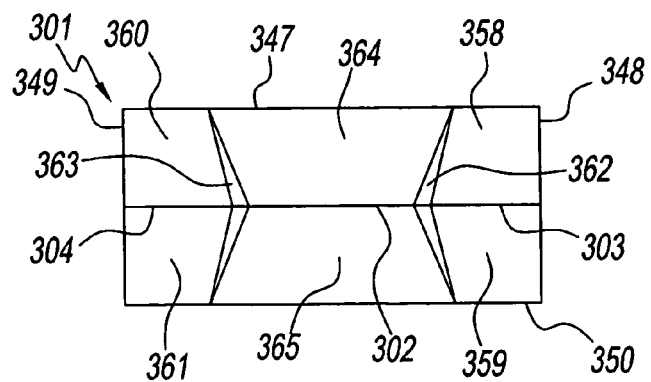
FIG. 5C is a bottom elevational view of the ram of FIG. 5A.

In testing, on a scale of one to ten, whereas the traditional "V" shape ram of FIG. 3 received a rating of 6 out of ten in distributive mixing, the ram form of the invention shown in FIG. 5 received a 9 out of ten in distributive mixing, wherein the rating system is such that 1 is the worst and ten is the best. In addition, the improved ram allows for larger batch sizes, thereby increasing the machine efficiency and a measurable reduction in noise and vibration.

It will be appreciated by that the invention has been illustrated by certain embodiments thereof and that modification and changes thereto can be made without departing from the spirit and scope of the disclosed invention. Features found in one of the embodiments of the invention may be employed in the other embodiments so long as the features are not inconsistent with the other features of the various embodiments. Moreover, various other embodiments of rams of this invention may be obtained by any suitable combination of the features described.

We claim:

1. A ram for use in an internal, intensive batch mixing machine, having counter-rotating, non-intermeshing rotors in a mixing chamber, the ram comprising:

an upper and a lower portion, the upper portion being connectable to a rod of the batch mixing machine that allows the ram to be raised to a raised position to permit introduction of ingredients into an ingredients-receiving opening of the mixing chamber, and lowered to a lowered position to move the ingredients down into the mixing chamber, close the ingredients-receiving opening of the mixing chamber and oppose forces exerted by ingredients in the mixing chamber, the lower portion of the ram comprising:

a bottom surface for facing the mixing chamber when the ram is lowered to the lowered position, said bottom surface having a lateral length L, the bottom surface comprising:

a first end at a first lateral end of the length of the bottom surface of the ram, a second end at the opposite lateral end of the length of the bottom surface of the ram, a first intermediate section extending from the first end of the bottom surface to one edge of a central section a lateral distance A, a second intermediate section extending from the second end of the bottom surface to another and opposite edge of the central section a lateral distance A, the central section being between said first and second intermediate sections comprising four protruding surfaces that meet at a protruding apex parallel to a rotational axis of rotors of the internal batch mixing machine with which the ram is to be employed, each protruding surface of the central section shaped such that a horizontal cross-sectional area of said central section of the bottom surface is of a smaller cross-sectional area than the cross-sectional area of the ingredients-receiving opening into the mixing chamber of the internal batch mixer into which the ram is to be inserted, such that the protruding apex is of a lateral distance less than the lateral length L of the bottom surface, the central section sized such that protruding apex will extend a distance into the mixing chamber of the internal batch mixing machine with which the ram is to be used when the ram is lowered to it lowered position, wherein the protruding apex comprises a point at which the four protruding surfaces of the central section meet.

2. A ram according to claim 1, wherein the four surface of the central section each comprise a generally flat surface.

3. An internal, intensive batch mixing machine, having counter-rotating, non-intermeshing rotors in a mixing chamber and a ram for introducing material to be mixed into the mixing chamber through an ingredients-receiving opening, the ram comprising a ram according to claim 1.

4. An internal, intensive batch mixing machine according to claim 3, wherein the four surface of the central section each comprise a generally flat surface.

5. A ram for use in an internal, intensive batch mixing machine, having counter-rotating, non-intermeshing rotors in a mixing chamber, the ram comprising;

an upper and a lower portion, the upper portion being connectable to a rod of the batch mixing machine that allows the ram to be raised to a raised position to permit introduction of ingredients into an ingredients-receiving opening of the mixing chamber, and lowered to a lowered position to move the ingredients down into the mixing chamber, close the ingredients-receiving opening of the mixing chamber and oppose forces exerted by ingredients in the mixing chamber, the lower portion of the ram comprising:

a bottom surface for facing the mixing chamber when the ram is lowered to the lowered position, said bottom surface having a lateral length L, the bottom surface comprising:

a first end at a first lateral end of the length of the bottom surface of the ram, a second end at the opposite lateral end of the length of the bottom surface of the ram, a first intermediate section extending from the first end of the bottom surface to one edge of a central section a lateral distance A, a second intermediate section extending from the second end of the bottom surface to another and opposite edge of the central section a lateral distance A, the central section being between said first and second intermediate sections comprising four protruding surfaces that meet at a protruding apex parallel to a rotational axis of rotors of the internal batch mixing machine with which the ram is to be employed, each protruding surface of the central section shaped such that a horizontal cross-sectional area of said central section of the bottom surface is of a smaller cross-sectional area than the cross-sectional area of the ingredients-receiving opening into the mixing chamber of the internal batch mixer into which the ram is to be inserted, such that the protruding apex is of a lateral distance less than the lateral length L of the bottom surface, the central section sized such that protruding apex will extend a distance into the mixing chamber of the internal batch mixing machine with which the ram is to be used when the ram is lowered to it lowered position, and wherein a first of the four protruding surfaces of the central section extends from an end of first intermediate surface to a first end of the protruding apex line, a second of the four protruding surfaces of the central section extends from an end of the second intermediate surface to a second and opposite end of the protruding apex line, said first and second protruding surfaces of the central section extend from the end of the intermediate section from which it extends to the protruding apex at an angle perpendicular to the protruding apex of the central lateral section.

6. An internal, intensive batch mixing machine, having counter-rotating, non-intermeshing rotors in a mixing chamber and a ram for introducing material to be mixed into the mixing chamber through an ingredients-receiving opening, the ram comprising a ram according to claim 5.

7. A ram for use in an internal, intensive batch mixing machine, having counter-rotating, non-intermeshing rotors in a mixing chamber, the ram comprising:

an upper and a lower portion, the upper portion being connectable to a rod of the batch mixing machine that allows the ram to be raised to a raised position to permit introduction of ingredients into an ingredients-receiving opening of the mixing chamber, and lowered to a lowered position to move the ingredients down into the mixing chamber, close the ingredients-receiving opening of the mixing chamber and oppose forces exerted by ingredients in the mixing chamber the lower portion of the ram comprising:
- a bottom surface for facing the mixing chamber when the ram is lowered to the lowered position, said bottom surface having a lateral length L, the bottom surface comprising:
  - a first end at a first lateral end of the length of the bottom surface of the ram,
  - a second end at the opposite lateral end of the length of the bottom surface of the ram,
  - a first intermediate section extending from the first end of the bottom surface to one edge of a central section a lateral distance A,
  - a second intermediate section extending from the second end of the bottom surface to another and opposite edge of the central section a lateral distance A,
  - the central section being between said first and second intermediate sections comprising four protruding surfaces that meet at a protruding apex parallel to a rotational axis of rotors of the internal batch mixing machine with which the ram is to be employed, each protruding surface of the central section shaped such that a horizontal cross-sectional area of said central section of the bottom surface is of a smaller cross-sectional area than the cross-sectional area of the ingredients-receiving opening into the mixing chamber of the internal batch mixer into which the ram is to be inserted, such that the protruding apex is of a lateral distance less than the lateral length L of the bottom surface, the central section sized such that protruding apex will extend a distance into the mixing chamber of the internal batch mixing machine with which the ram is to be used when the ram is lowered to it lowered position, and wherein the first and second intermediate sections of the ram would protrude a given distance into the mixing chamber when the ram is in its lowered position in connection with an internal batch mixer with which it is to be employed, and the first and second intermediate sections have a combined a cross-sectional area that is greater than the cross-sectional area of the central section.

8. An internal, intensive batch mixing machine, having counter-rotating non-intermeshing rotors in a mixing chamber and a ram for introducing material to be mixed into the mixing chamber through an ingredients-receiving opening, the ram comprising a ram according to claim 7.

* * * * *